(12) United States Patent
Watanabe et al.

(10) Patent No.: US 7,778,443 B2
(45) Date of Patent: Aug. 17, 2010

(54) IMAGE FOCUSING DEVICE WITH MOTOR

(75) Inventors: Mitsuru Watanabe, Tokyo (JP); Masato Iwakawa, Tokyo (JP); Satoshi Singu, Tokyo (JP); Hisato Kato, Yokohama (JP)

(73) Assignee: NEC Corporation (JP)

( * ) Notice: Subject to any disclaimer, the term of this patent is extended or adjusted under 35 U.S.C. 154(b) by 1129 days.

(21) Appl. No.: 10/384,886

(22) Filed: Mar. 7, 2003

(65) Prior Publication Data

US 2003/0169364 A1    Sep. 11, 2003

(30) Foreign Application Priority Data

Mar. 8, 2002    (JP) .............................. 2002-063655

(51) Int. Cl.
*G06K 9/00* (2006.01)

(52) U.S. Cl. ..................................... 382/101

(58) Field of Classification Search ............... 382/101, 382/106, 143, 299, 312, 100, 203, 257, 262, 382/264, 268, 255; 348/208.12; 250/201.2, 250/201.4; 193/8; 901/24; 74/10.15; 396/244, 396/255, 260; 310/49; 318/685
See application file for complete search history.

(56) References Cited

U.S. PATENT DOCUMENTS

| | | | | |
|---|---|---|---|---|
| 4,446,485 A * | 5/1984 | Bardl | .......................... | 348/316 |
| 4,553,193 A * | 11/1985 | Evans | ............................. | 362/8 |
| 4,575,248 A * | 3/1986 | Horwitz et al. | ............ | 356/520 |
| 4,578,749 A * | 3/1986 | Kuno et al. | ................... | 700/56 |
| 4,725,879 A * | 2/1988 | Eide et al. | ..................... | 348/35 |
| 4,734,612 A * | 3/1988 | Sasaki et al. | .................. | 313/15 |
| 4,755,044 A * | 7/1988 | Thorn | ......................... | 351/206 |
| 4,972,494 A * | 11/1990 | White et al. | ................ | 382/143 |
| 5,255,088 A * | 10/1993 | Thompson | ................... | 348/90 |
| 5,276,530 A * | 1/1994 | Siegel | ........................ | 358/406 |
| 5,319,462 A * | 6/1994 | Haruki et al. | ............... | 348/347 |
| 5,610,654 A * | 3/1997 | Parulski et al. | ........... | 348/229.1 |
| 5,684,530 A * | 11/1997 | White | ........................ | 348/131 |
| 5,699,161 A * | 12/1997 | Woodworth | ................. | 356/628 |
| 5,841,881 A | 11/1998 | Iwakawa et al. | | |
| 5,912,698 A * | 6/1999 | Graulich et al. | .............. | 348/91 |
| 6,040,677 A * | 3/2000 | Oono et al. | ................. | 318/696 |

(Continued)

FOREIGN PATENT DOCUMENTS

EP    0647479 A2    4/1995

(Continued)

OTHER PUBLICATIONS

Search Report issued by European Patent Office on Mar. 8, 2007 in connection with corresponding patent application No. 03 004 975.3.

(Continued)

*Primary Examiner*—Matthew C Bella
*Assistant Examiner*—Dennis Rosario
(74) *Attorney, Agent, or Firm*—Ostrolenk Faber LLP

(57) ABSTRACT

An illumination unit 6 illuminates a scene object (i.e., mail) 2 moved in a predetermined direction by a transport means (transport conveyor) 1, the imaging distance up to the scene object 2 is detected before imaging, and auto-focusing is made according to distance data detected at the time of the imaging.

17 Claims, 12 Drawing Sheets

U.S. PATENT DOCUMENTS

| | | | |
|---|---|---|---|
| 6,104,427 A * | 8/2000 | Stein et al. | 348/61 |
| 6,115,147 A * | 9/2000 | Mizumoto et al. | 358/483 |
| 6,122,001 A | 9/2000 | Micaletti et al. | |
| 6,421,451 B1 * | 7/2002 | Shiratsuchi et al. | 382/101 |
| 6,484,066 B1 * | 11/2002 | Riess et al. | 700/217 |
| 6,704,501 B1 * | 3/2004 | Washisu | 396/55 |
| 6,750,435 B2 * | 6/2004 | Ford | 250/201.2 |
| 6,971,578 B2 * | 12/2005 | Tsikos | 235/462.14 |
| 7,053,953 B2 * | 5/2006 | Belz et al. | 348/346 |
| 2001/0019619 A1 * | 9/2001 | Watanabe et al. | 382/101 |

FOREIGN PATENT DOCUMENTS

| | | |
|---|---|---|
| JP | 52-143824 | 11/1977 |
| JP | 02-254001 | 11/1987 |
| JP | 63-189978 | 8/1988 |
| JP | 2-171883 | 7/1990 |
| JP | 04-198929 | 7/1992 |
| JP | 9-131573 | 5/1997 |
| JP | 10-187952 | 7/1998 |
| JP | 2001-174695 | 6/2001 |
| JP | 2001-243458 | 9/2001 |
| WO | 95/24278 | 9/1995 |
| WO | 98/32545 | 7/1998 |

OTHER PUBLICATIONS

Office Action issued by Japanese Patent Office on May 18, 2007 in connection with corresponding Japanese application No. 2002-063655.

English Translation of Office Action issued by Japanese Patent Office on May 18, 2007 in connection with corresponding Japanese application No. 2002-063655.

Office Action issued by the Japanese Patent Office on Aug. 10, 2007 in connection with corresponding Japanese Patent Application No. 2002-063655.

Translation of the Office Action issued by the Japanese Patent Office on Aug. 10, 2007 in connection with corresponding Japanese Patent Application No. 2002-063655.

* cited by examiner

IMAGE FOCUSING DEVICE WITH MOTOR

BACKGROUND OF THE INVENTION

This application claims benefit of Japanese Patent Application No. 2002-063655 filed on Mar. 8, 2002, the contents of which are incorporated by the reference.

The present invention relates to image input apparatuses and, more particularly, to image input apparatuses for inputting monochromatic or color images of parts of mails illuminated from an illumination light source for sorting the mails with image recognition.

This type of image input apparatus is in actual use in a state that it is mounted in apparatuses for sorting out letters (such as postal cards and standard-size mails) and also postal matter called flat mails (the apparatuses being called letter sorter and flat mail sorter, respectively). In these sorters, an image input apparatus reads out images of mails, and succeeding stage recognition processor reads out destination names written on the mail surfaces. As a result of this reading, the mails are sorted out and accommodated in sorting boxes for respective distribution areas. Prior art techniques of this kind, for automatically reading out names of postal matter or the like, are disclosed in Japanese Patent Laid-Open No. 2001-243458, Japanese Patent Laid-Open No. 63-189978, Japanese Patent Laid-Open No. 2-171883, Japanese Patent Laid-Open No. 9-131573 and Japanese Patent Laid-Open No. 10-187952.

Compared to letters, flat mails are in a wide thickness range from small thickness to large thickness (of 50 mm at maximum), and are also in a wide area range up to a maximum size of 400 mm vertical and 300 mm horizontal. Accordingly, in image input apparatuses for flat mails, the optical system is designed such as to ensure broader field of view and greater depth compared to those in the case of letters.

Postal matter called pack mails are of sizes greater than those of flat mails, for instance one of 600 mm maximum height, 500 mm vertical and 600 mm horizontal. In view of the sorting of mails with image recognition, a sorter for pack mails (hereinafter referred to as pack mail sorter) has to meet ten or more times the thickness requirement for the flat mail sorter.

With extension of the prior art techniques concerning the image input apparatuses for flat mails, therefore, it is difficult to meet the above thickness requirement due to limitation posed by illumination depth and scene object depth of camera (i.e., range of scene object position viewed to be in focus).

SUMMARY OF THE INVENTION

An object of the present invention is to provide an image input apparatus, which is for use with postal matter sorter for dealing with various size postal matter including pack mails and permits fast and high performance sorting in image recognition processing like those in the letter sorter and flat mail sorter.

According to an aspect of the present invention, there is provided an image input apparatus for illuminating a scene object moved in a predetermined direction by a transport means from an illuminating means, imaging the scene object with an imaging means and discriminating data of the scene object from the imaged data, wherein: an imaging distance up to the scene object is detected before the imaging, and auto-focusing is made according to the detected distance data at the time of the imaging.

In the present invention, the imaging distance is preliminarily measured by an imaging distance detecting means, which is disposed on the upstream side of the imaging position in the mail transport direction, and for imaging an auto-focusing means does auto-focusing according to the measured imaging distance, thus realizing great object scene depth of the camera.

In the detection of the imaging distance, the height of a mail is measured for reading out the mail top surface. This measure is also applied to the case of reading out the front (or rear) side surface of the mail at the same time. Specifically, for the imaging and illumination an angle (for instance 45 degrees) is set forwardly downward with respect to the transport direction in the case of reading out both the front side surface and the top surface and rearwardly downward in the case of reading out both the rear side surface and the top surface.

In the reading of mail side surface, the imaging distance is detected by measuring the position of mail in the direction perpendicular to the mail transport direction. This measure is also applied in the case of reading out the front (or rear) surface at the same time. Specifically, for the imaging and illumination an angle (for instance 45 degrees) is set forwardly downward with respect to the mail transport direction in the case of reading out the front surface and side surface and rearwardly downward in the case of reading out the rear surface and side surface.

The auto-focusing is made by causing back-and-forth movement of a printed board with linear array CCD mounted thereon with a commercially available linear stepping motor. For the auto-focusing, such an optical design is made that a sensor side focus range (i.e., focus depth), which is obtainable without auto-focusing, is several 10 μm with respect to a stepping motor positioning accuracy of 10 μm. Accurate auto-focusing is thus possible, which is inexpensive and can sufficiently provide for the aim.

The positioning is normally made as relative positioning. However, when the inter-mail interval is more than positioning movement time inclusive of initial state restoration time, the initial state restoration is always made to prevent continual positioning deviation in the event of positioning deviation caused by an external shock or the like.

For the auto-focusing operation, only part of the full movable range is used, and it is possible that the pertinent part is deteriorated sooner due to grease use-up. Accordingly, right after the power turning-on the full stroke operation is always caused several times to provide grease sufficiently uniformly, thus realizing longer life of maintenance-free duty service.

The auto-focusing is made by moving the sensor. Therefore, when the ratio of the line scan direction (i.e., main scanning direction) and the mail transport direction (i.e., auxiliary scanning direction) is set to 1:1, for instance, at the position of the maximum imaging distance from the sensor side, with reducing imaging distance the field of view becomes narrower to increase the ratio of the scan direction to the mail transport direction, resulting in deviation of the vertical-to-horizontal ratio. Accordingly, scan direction thin-out process according to the imaging distance is made for compensation for providing stable vertical-to-horizontal ratio at all times.

Furthermore, a plurality of mirrors are used to provide as long optical path as possible in a limited space and suppress field-of-side variations due to imaging distance variations as much as possible. Mirrors which have sufficient surface accuracy and are sufficiently thick to avoid distortion at the time of the mounting, are selected for use.

As for the illumination, as high intensity and uniform illumination as possible in the above depth width and imaging width are required. High illumination intensity does not merely lead to signal-to-noise ratio improvement of signal but also leads improvement of the camera depth free from mechanical auto-focusing based on lens top operation, and also it permits imaging with increased focus accuracy with respect to irregularities of the scene object in the scan direction. Uniformity reduces load on subsequent stage analog gain compensation, and leads to improvement of the image quality.

The present device accordingly uses orange-color high-voltage sodium lamps, which provide high brightness and are excellent in long life and stability, as illumination light source. A plurality of high-voltage sodium lamp tubes are used, and the shape of an illumination light reflector is contrived such as to permit as high intensity and uniform illumination with the above depth width and imaging width.

In the case of color imaging, it is necessary to make coarse color balance compensation with sharp-cut color filters. Doing so results in corresponding light dose reduction, imposing limitation on the resolution or rate of imaging. Accordingly, for particularly high resolution color imaging, white metal halide lamps are used, which are inferior in light dose to the sodium lamps but permit more light dose to be obtained as a result.

As for the angle of imaging and illumination, such a disposition is adopted as to avoid incidence of right reflection light from a vinyl seal or the like on the imaging system as much as possible.

Moreover, generation of envelope follow-up signal subsequent to analog-to-digital conversion, is contrived such as to suppress contrast deterioration due to right reflection light.

Other objects and features will be clarified from the following description with reference to attached drawings.

PREFERRED EMBODIMENTS OF THE INVENTION

Figure 1:
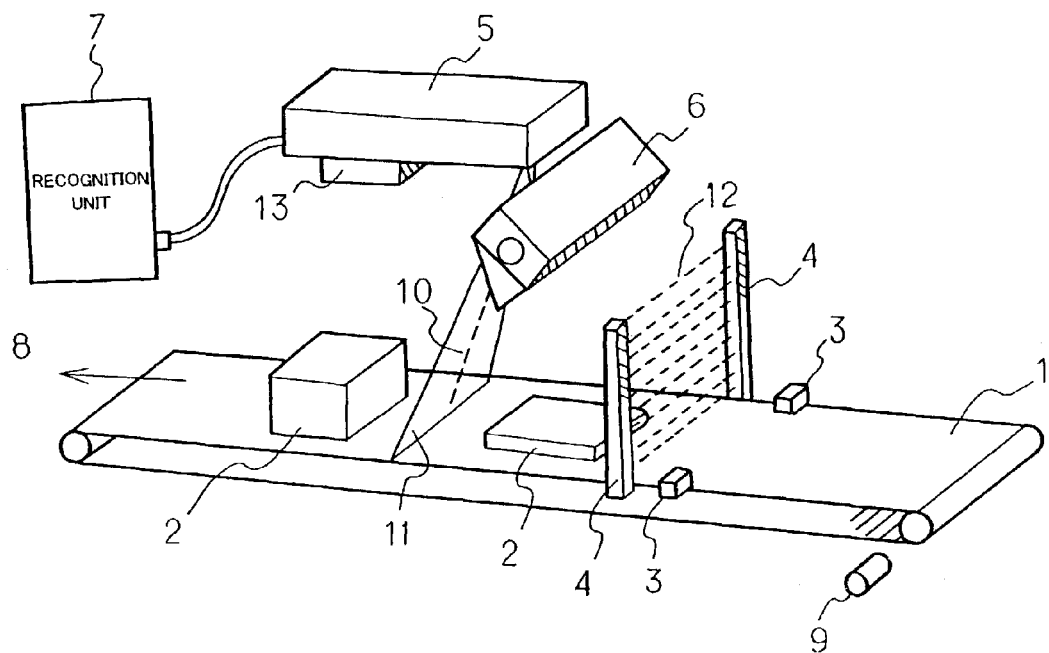
FIG. 1 is a perspective view schematically showing the construction of a first embodiment of the image input apparatus according to the present invention.

Preferred embodiments of the present invention will now be described in detail with reference to the drawings. In the first place, a first embodiment of the present invention will be described with reference to drawings. Referring to FIG. 1, a transport conveyor 1 supporting mails 2 on it is moved at a constant speed. A photoelectric sensor 3 detects the mails 2 passing by it, and outputs resultant mail detection signal to a camera unit 5. A rotary encoder 9 also outputs pulses of cycle time proportional to the speed of the transport conveyor 1 to the camera unit 5.

Figure 2:
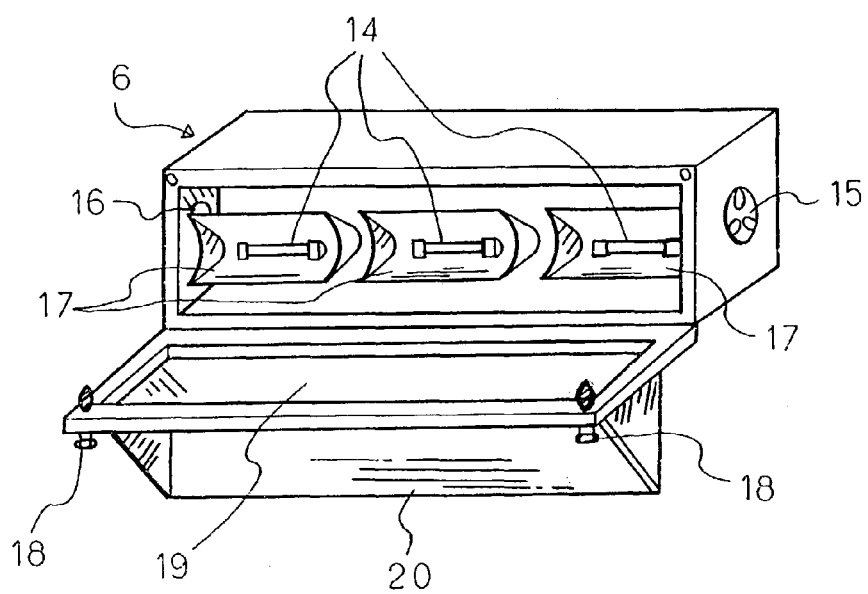
FIG. 2 is a perspective view schematically showing the construction of an illumination unit shown in FIG. 1.

An illumination unit 6 does linear illumination of the mails 2. The construction of the illumination unit 6 will now be described with reference to FIG. 2. FIG. 2 shows the illumination unit 6 with a hinged front cover opened by loosening screws 18. As shown, the illumination unit 6 includes three lamp tubes 14, reflectors 17 associating therewith, an air withdrawal fan 15 provided in one side wall, an air exhaust fan 16 provided in the opposite side wall, a front glass member 19 partitioning an illumination opening part in the cover, and an auxiliary reflector 20 mounted in front of the front cover. The inside of the illumination unit 6 is air cooled by the withdrawal and exhaust fans 15 and 16. For dust-proof purposes, the individual fans are provided with dust-proof meshes.

In dependence on whether the lamp tubes 14 are high-voltage sodium lamps or metal halide lamps, the reflectors 17 and the auxiliary reflector 20 are designed and mounted such as to illuminate the field of view of the camera as uniformly and with as high illumination intensity as possible in the necessary scene object depth and field of view. Also, in dependence on the characteristics of the individual lamps, the lamp tube surfaces and the front glass member 19 have a coating for cutting off heat rays and ultraviolet rays, thus suppressing heat ray and ultraviolet ray illumination as much as possible and realizing high intensity illumination based on the visible light range.

The circuit construction of the first embodiment of the present invention will now be described with reference to FIG. 3. The camera unit 5 can be thought from the status of signals to be processed that it is constituted by an optical part and an electric part. The optical part is constituted by mirrors 22 for reflecting reflected light beam 21 in the sight 11 of field of the camera several times, a shading compensator 24 for performing shading compensation, filters, a converging or focusing lens 27 and a linear array CCD 29 for receiving image from the lens 27.

The electric part is constituted by a CCD circuit 30 for performing photo-electric conversion, a CCD drive circuit 32 for generating CCD drive signal, a video signal processing circuit 33 for digitally converting electric signal from the CCD circuit 30 by amplification and normalization and performing compensation of each digital image, an image data transfer circuit 34 for performing parallel-to-serial conversion of video signal and outputting the resultant signal to an image recognition processor 35 in a recognition unit 7, a control circuit 36 for communicating with a parameter controller 37 in the recognition unit 7 by receiving signals from the photo-electric sensor 3, the area sensor 4 and the rotary encoder 9 and setting parameters in an auto-focusing module 31 and a video signal processing circuit 33.

Figure 4:
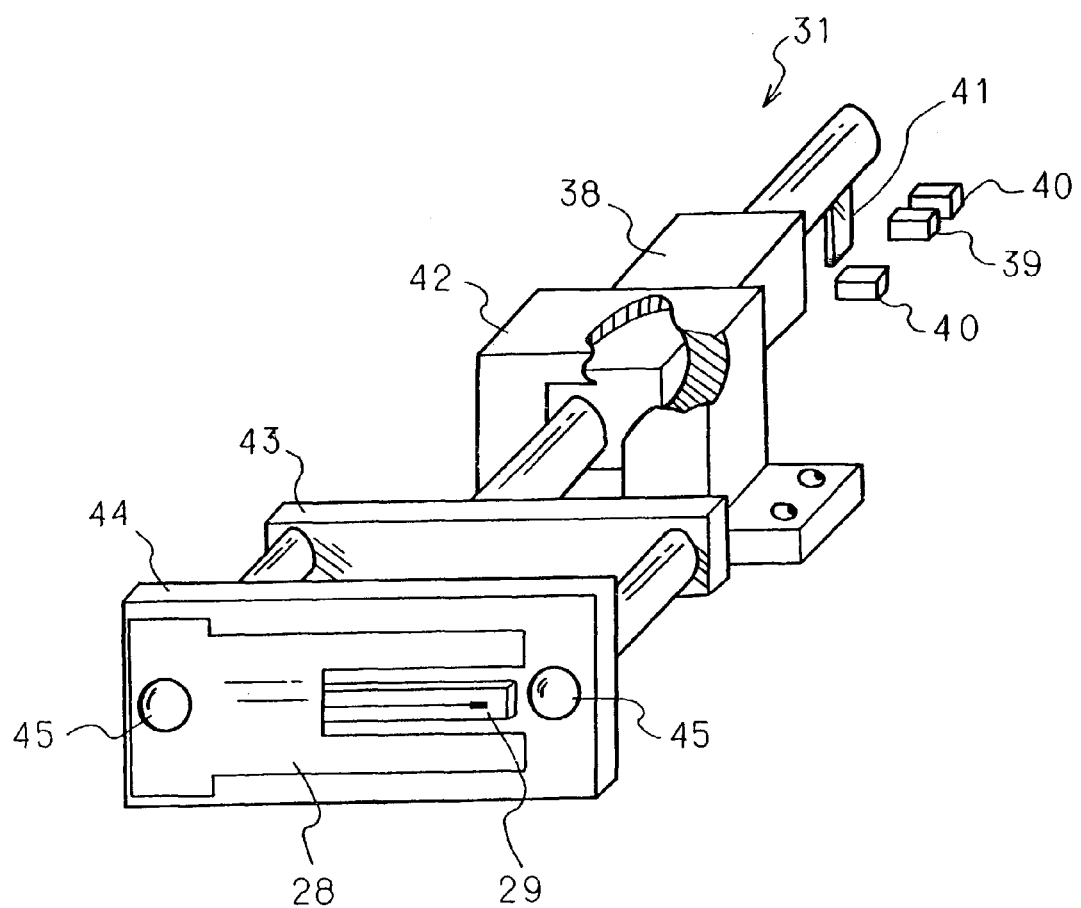
FIG. 4 is a perspective view showing the construction of an auto-focusing module 31 shown in FIG. 3.

The construction of the auto-focusing module 31 will be described in detail with reference to FIG. 4. A linear stepping motor 38 is secured to a securing member 42. The securing member 42 also has a role of causing escape of heat from the motor, and to this end it uses a good heat conductor metal.

A CCD board securing member 43 is mounted on the end of the shaft of the linear stepping motor 38. A CCD board 44, which supports the linear array CCD 29, a shelter 28 for partly sheltering light therefrom and the CCD circuit 30 shown in FIG. 3, are mounted on the CCD board securing member 43 by CCD board securing screws 45. A shelter member 41 for origin and edge detection is mounted on the motor shaft, and a photo-electric origin sensor 39 and photo-electric edge limit sensors 40 are disposed in relation to the shelter member 41.

Figure 5:
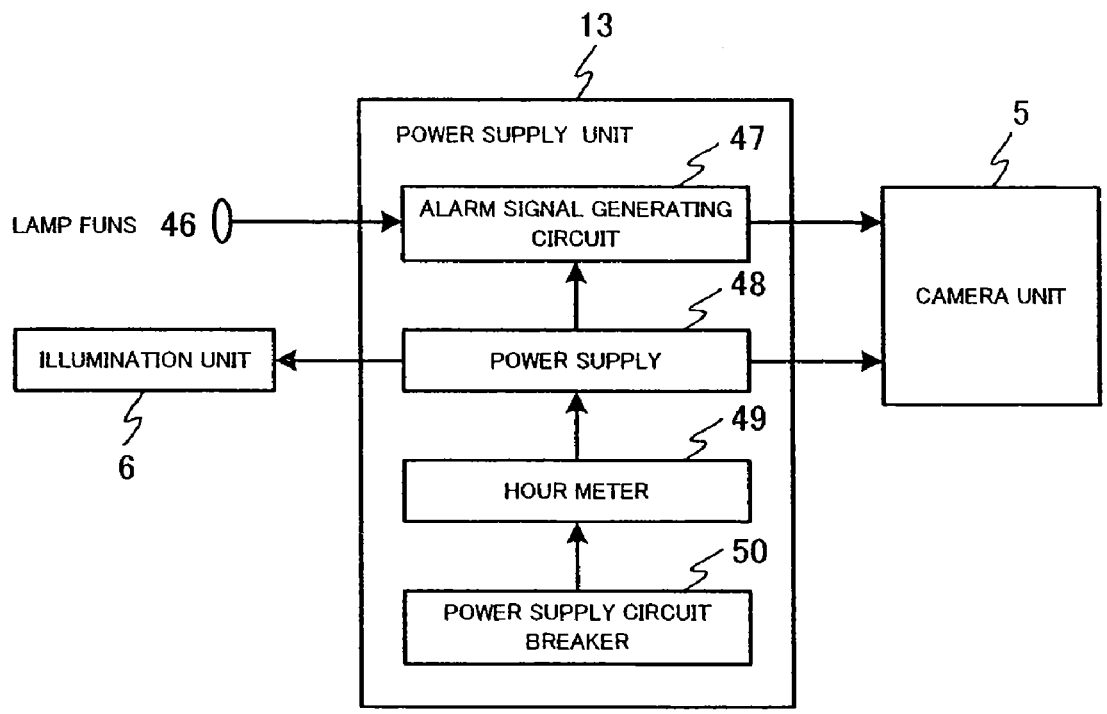
FIG. 5 is a block diagram showing the construction of a power supply unit 13 shown in FIG. 1.

FIG. 5 shows a power supply unit 13, which includes an alarm signal generating circuit 47 for detecting various alarm signals from lamp fans 46 and the like and outputting the detected signals to the camera unit 5, a power supply 48, an hour meter 49 for integrating and displaying time passed for maintenance purposes and a power supply circuit breaker 50.

The recognition unit 7 is constituted by the image recognition processor 35, which performs an image recognition process on image data from the image data transfer circuit 34, and a parameter controller 36, which transfers various parameters at a certain timing of the photoelectric sensor 3 to the auto-focusing module 31 and the video signal processing circuit 33 according to the values of data from the area sensor 4.

The operation of the first embodiment for the present invention will now be described.

Figure 6:
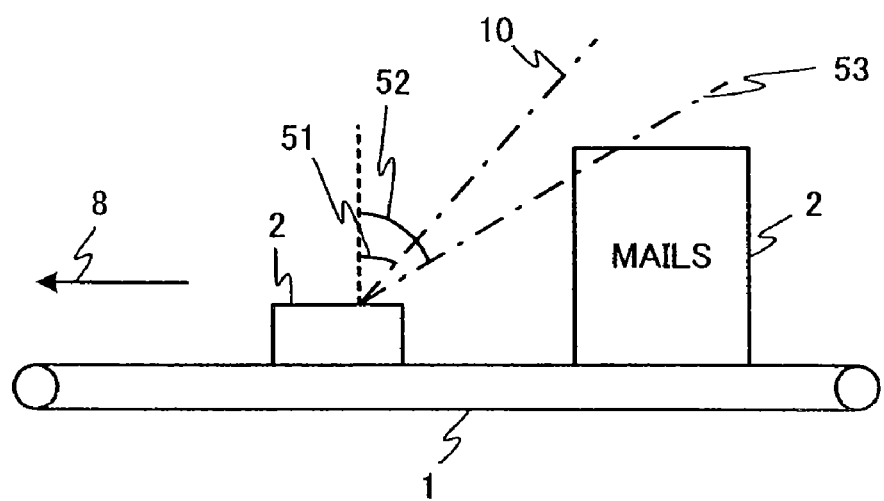
FIG. 6 is a view for describing the case when imaging can not be made due to a relation of mails transported in succession to one another.

Referring to FIG. 6, the illumination unit 6 shown in FIG. 1 has its illumination light beam optical axis angle 52 which, like the optical axis 51 of the camera, is set such that it makes an acute angle with respect to a direction perpendicular to the transport direction 8, while performing illumination at an angle slightly different from the optical axis angle 51 of the camera.

Figure 7:
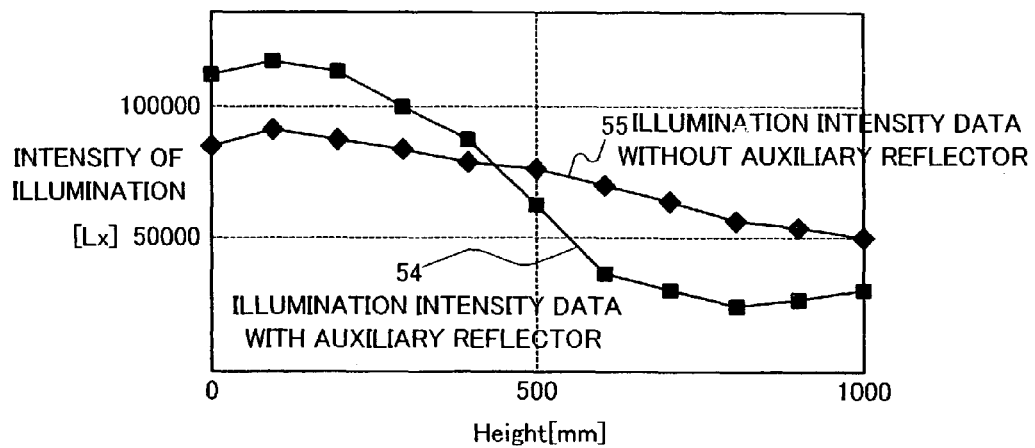
FIG. 7 is a view for describing the effect of an auxiliary reflector.

The illumination unit 6 also performs illumination as uniformly and with as high illumination intensity as possible in the necessary scene object depth and field of view range of the camera. FIG. 7 shows illumination intensities in the field of view range of the camera at various height positions. Regarding height variations from 0 mm to 1,000 mm, the auxiliary reflector 20 has an effect of suppressing the maximum-to-minimum ratio from more than 4 times to less than two times, thus improving the uniformity.

As shown in FIG. 1, the mails 2 are transported on the transport conveyor 1 at a constant speed. Signal from the photoelectric sensor 3, which is of transmitting type and is disposed in front of the area sensor 4, is outputted as signal representing area sensor data take-in timing and imaging timing to the camera unit 5.

The control circuit 37 in the camera unit 5 takes out area sensor data by using the pulse signal from the rotary encoder 9 and causing delay of the signal from the photoelectric sensor 3 to an extent corresponding to the distance between the photoelectric sensor 3 and the area sensor 4. The control circuit 37 detects the inter-mail interval from the signal of the photoelectric sensor 3.

The data of the area sensor 4 is transferred via the control circuit 37 to the parameter controller 36. According to the area sensor data, the parameter controller 36 presets gain compensation parameter and thinning-out parameter in LUT form in the video signal processing circuit 33 right before the start of imaging upon appearance of a mail in the field 11 of sight of the camera.

Figure 8:
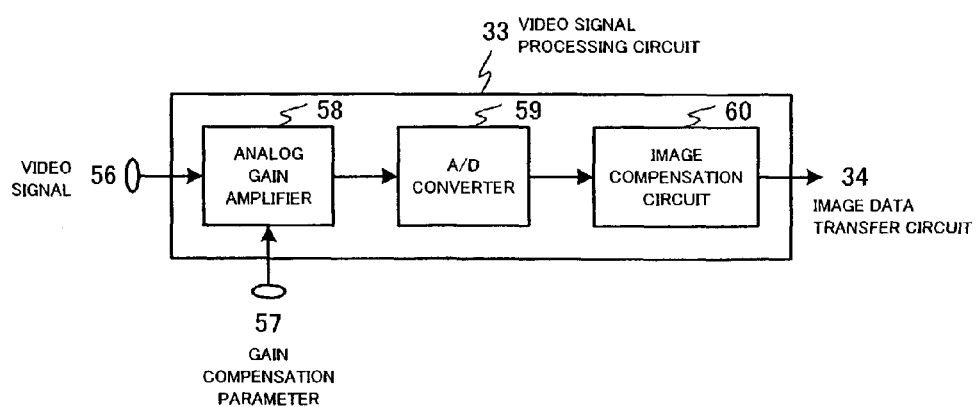
FIG. 8 is a block diagram schematically showing a video signal processing circuit.

As shown in FIG. 8, gain compensation parameter 57 is preset in an analog gain amplifier 58, and level variations of video signal 56 due to brightness variations corresponding to the height of illumination are suppressed before analog-to-digital conversion. Illumination intensity variations corresponding by the reflectors 17 and the auxiliary reflector 20 to the height of illumination have been suppressed to extents as shown in FIG. 7. It is possible as well to suppress brightness variation by designing the reflectors in greater details. Doing so, however, is not practical from the standpoints of both cost and mass production. Accordingly, the variation suppression based on the reflector design is made only up to coarse adjustment to extents as shown in FIG. 7, and fine adjustment is made in the gain compensator.

Where the optical axis 10 of the camera is at an angle with respect to the transport conveyor 1, the timing of appearance of the mail in the field 11 of sight of the camera, is varied according to the height of the mail, i.e., the area sensor data. For example, where the optical axis angle 51 of the camera is 18 degrees, the position of start of imaging is different by about 16 cm with a difference of height of 50 cm (50 cm×tan (10 degrees)). Thus, the imaging start timing delay is preliminarily calculated from the optical axis angle 51 of the camera and tabulated in the parameter controller 36, and delay parameter corresponding to the area sensor data is read out in the LUT and preset in the control circuit 37.

The parameter controller 36 presets the step number of the linear stepping motor 38 in the auto-focusing module 31. The timing of this presetting has to take the operation time of the auto-focusing module 31 into considerations. When the inter-mail interval of adjacent mails is longer than the positioning motion time (about 1880 msec. at the most) after the restoration to the origin, absolute positioning is made.

In the absolute positioning, the step number of the linear stepping motor 38 is set as the step number preset in the parameter controller 36. The presetting is made 180 msec. before the imaging, and at the same time the operation of restoration to the origin is started. After the restoration to the origin, positioning motion is caused by the automatically preset step number.

When the inter-mail interval of adjacent mails is shorter than the above time, relative positioning is made. In the relative positioning, the step number of the linear stepping motor 38 is set as the difference of the step number from the step number preset in the parameter controller 36 to the step number corresponding to the immediately preceding mail. The sign of the difference represents the direction of motion. Specifically, the stepping motor is moved by the absolute value step number in the direction to cause the CCD to move toward the lens (i.e., scene object) in the negative difference case and to move away from the lens in the positive difference case. The presetting is made before the start of imaging by a time, which is a sum of a time proportional to the step number and an off-set of acceleration or deceleration, and at the same time the motion of that step number is started.

When the inter-mail interval is so short as to be shorter than the relative positioning time, preference is given to the next mail. That is, the motion of the stepping motor is started during imaging of the present mail as above-described, so as to be in time for the imaging of the next mail. This happens in a case as shown in FIG. 6, as well as the case when the inter-mail interval is purely very short. That is, it is possible to predict the case when the optical axis angle 51 of the camera, the inter-mail interval and the area sensor data are in a relationship as shown in FIG. 6, and thus the above coping is possible.

Figure 9:
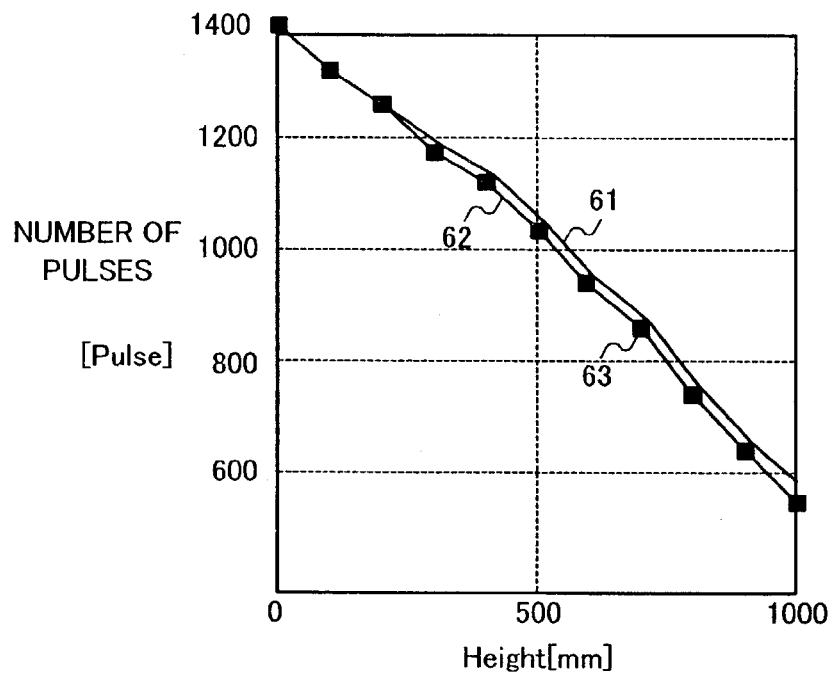
FIG. 9 is a graph showing the step number of movement of a linear stepping motor 38.

As for the step number of movement, as shown in FIG. 9, an experimentally obtained approximation plot 62 of measurement data 63 and a plot 61 which is obtained by adding off-set to a geo-optically theoretically obtained plot are substantially coincident. Thus, once the step number is preset, subsequent presetting is possible by merely adjusting the off-set.

The offset adjustment may be made by setting a focus adjustment chart in the field 11 of sight of the camera at a height of 0 mm, fixing the CCD 29 in position by moving the same by the step number before the height of 0 mm and turning the lens focusing ring. Alternatively, the offset adjustment may be made without moving the lens but by causing automatic step-by-step movement of the CCD 29 while taking out image and resetting the step number at the sharpest image position as the value of this time at the height of 0 mm.

When the mail height is constant with respect to the transport direction 8, the stepping motor is moved only for the above relative or absolute positioning. When the mail height is varying, it is also possible to cause follow-up movement of the stepping motor for auto-focusing in relation to a height profile obtained in the area sensor. In this case, the stepping motor is moved step by step by the step number corresponding to the height profile by matching its follow-up movement speed with the transport speed.

Figure 3:
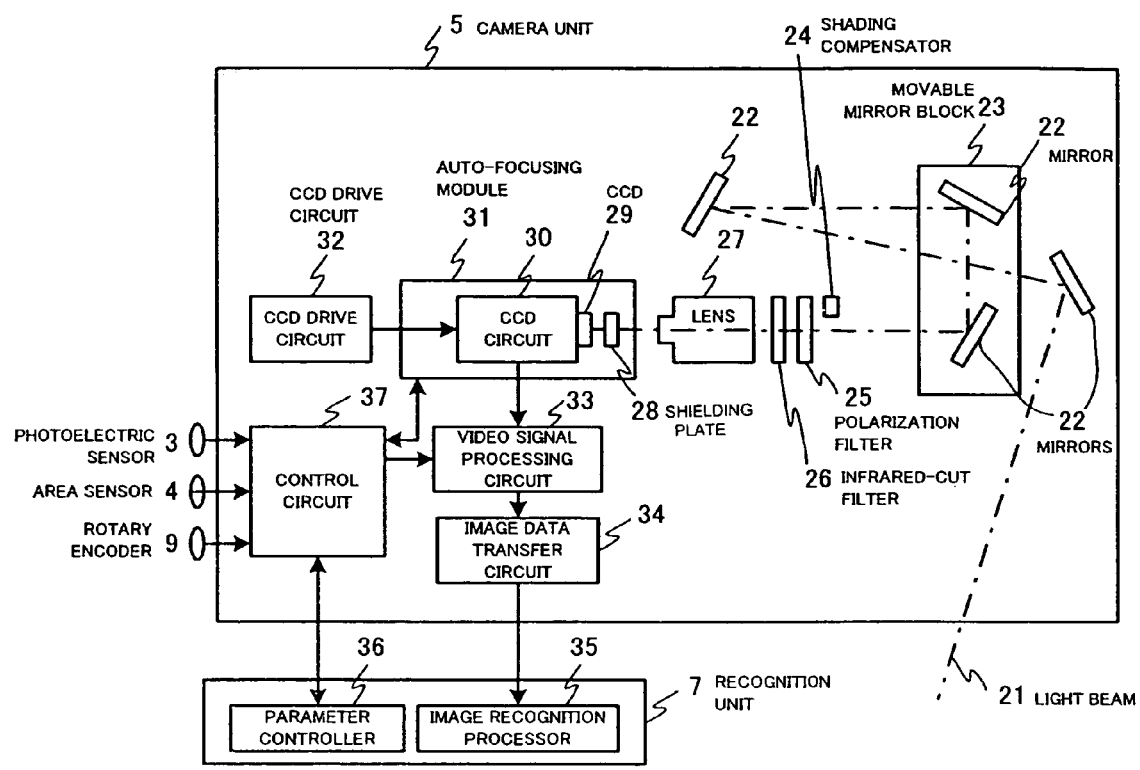
FIG. 3 is a block diagram schematically showing the circuit construction shown in FIG. 1.

As shown in FIG. 3, reflected light 21 from the surface of postal matter 2 is reflected a plurality of times by a plurality of mirrors 22 and then focused by the lens 27 on the CCD 29.

The mirrors 22 should be large in size and elongate in the direction of the field 11 of sight of the camera, and those which have a high surface accuracy of $\lambda/4$ and a thickness of 100 mm or above are used lest distortion should result at the mounting time. The use of a plurality of mirrors is adopted in order to provide as long optical path length in a limited space and suppress image magnification variations with height variation of mails 2 as much as possible.

Figure 10:
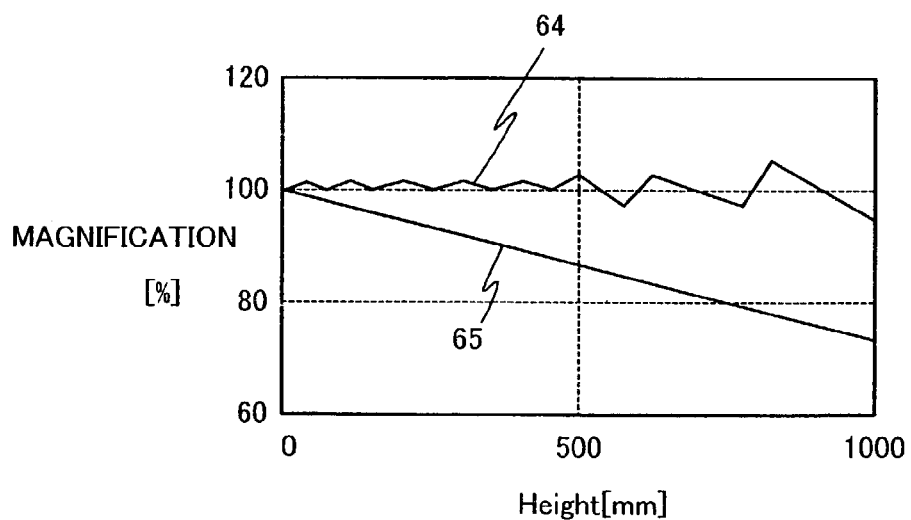
FIG. 10 is a graph for describing the effect of thinning-out with respect to magnification variations.

However, magnification variations as shown in FIG. 10 take place even with an optical path lengths of about 3.5 m. Accordingly, the variations are compensated for to 10% or below even at a height of 1,000 mm as shown by plot 65 in FIG. 10 by making a thinning-out process in accordance with the height.

Figure 11:
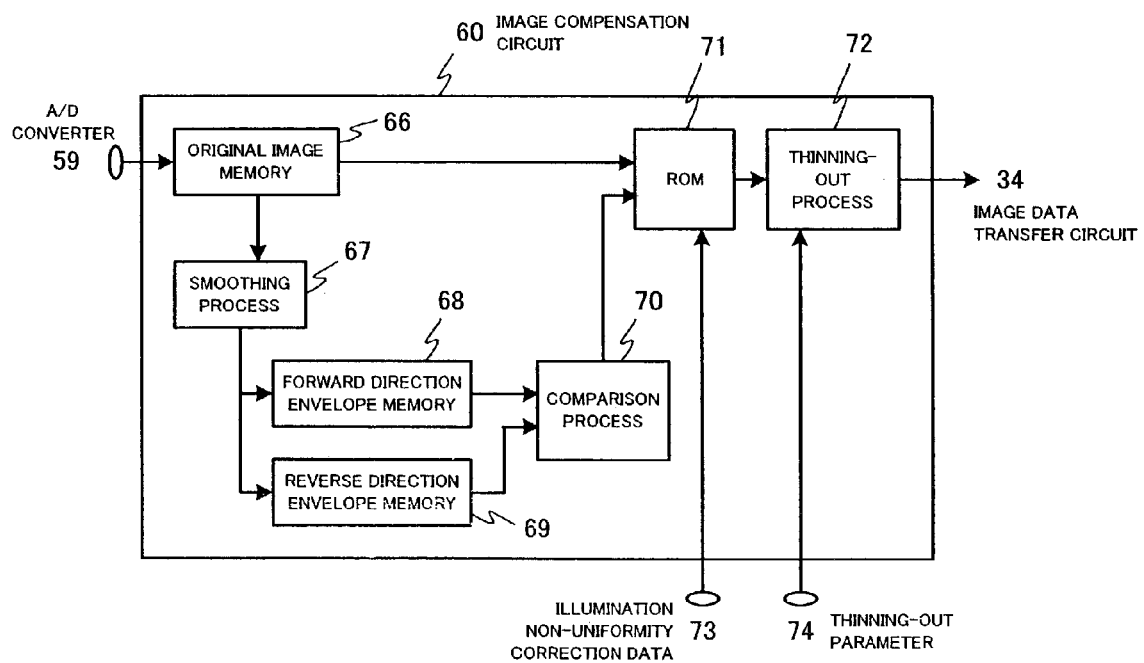
FIG. 11 is a block diagram showing the construction of an image compensation circuit 60.

As shown in FIG. 11, the thinning-out is made by presetting thinning-out parameter 74 in an image compensation circuit 60 of the video signal processing circuit 33 substantially at the timing of presetting the gain compensation parameter 57.

Of the mirrors 22, two are mounted on a movable mirror block 23, on which the two mirrors can reflect the optical path at an angle of 45 degrees, have plane normal at right angles to each other and can be moved in unison with each other. The movable mirror block 23 permits, when moved back and forth, changing the optical path length to an extent corresponding to double the movement, and it is thus particularly advantageous for optical path adjustment in a long optical path case as noted above.

As shown in FIG. 3, a shading corrector 24, a polarization filter 25 and an infrared-cut filter 26 are disposed in front of the lens 27. The shading corrector 24 is semi-circular, for instance, and serves to reduce the light intensity in a central part of the light beam to compensate for shading (i.e., brightness irregularities) due to the characteristics of the lens itself. The infrared-cut filter cuts infrared rays off near-infrared rays remaining in the illumination light beam, thus enhancing the contrast of letters or characters in ink reflectable by near-infrared rays such as ink of a ball pen. The polarization filter 25 suppresses right reflection light from a mail wrapped in a wrapping material readily giving rise to right reflection such as vinyl.

Particularly, where high voltage sodium lamp of orange color is used for color imaging, a sharp-cut filter is provided for coarse balance adjustment by transmitting blue to green color components without any light intensity reduction and transmitting the sole red color components in reduced light intensity.

The lens 27 is selectively adapted such as to take out a field of view of 512 mm in a magnification of 8.0 lines per mm as scan direction resolution. In this case, the number of pixels actually used in the CCD 29 is 4096 (=8.0 (pixels per mm)× 512 (mm)).

The CCD 29 converts the light beam signal focused by the lens 27 to electric signal. For cost reduction, as the CCD is used a versatile one with a pixel number more than the above pixel number. For providing improved resolution in the transport direction, the exposure time is preset to be shorter than the full pixel data transfer time. In this case, for avoiding image quality deterioration due to overlap of the next exposure light during transfer of pixel data after the exposure, the light shield plate 28 is used to prohibit exposure to pixels other than those in actual use.

In this connection, it should be taken into considerations that light leaks due to diffraction take place from between the light shelter and the CCD, resulting in slight exposure in an end part of the shielding plate as well. Accordingly, in addition to the data of pixels in actual use, part of the data of continuous pixels are transferred as idle data. Consequently, the actual exposure time is the sum of the exposure time for the pixels in actual use and that of the idle transfer data pixels.

As shown in FIG. 8, video signal 56 outputted from the CCD circuit 30 subjected to gain compensation in the video signal processing circuit 33, and then analog-to-digital converted.

The image compensation circuit 60 first detects the envelopes of the linear array CCD in the forward and reverse directions for gradation conversion and light dispersion compensation, and then performs a thinning-out process. FIG. 11 shows the circuit construction for this process In the process, the digital signal output of the A/D converter 59 is written in the output order of the linear array CCD in the original image memory 66, which has a capacity of holding a plurality of times. Then, image data for one line is subjected to a smoothing process 67, then the image data is read out in the direction of the output order of the CCD and also in the reverse direction for the envelope detection process, and the resultant data are written in a forward and a reverse direction envelope memory 68 and 69.

Figure 12:
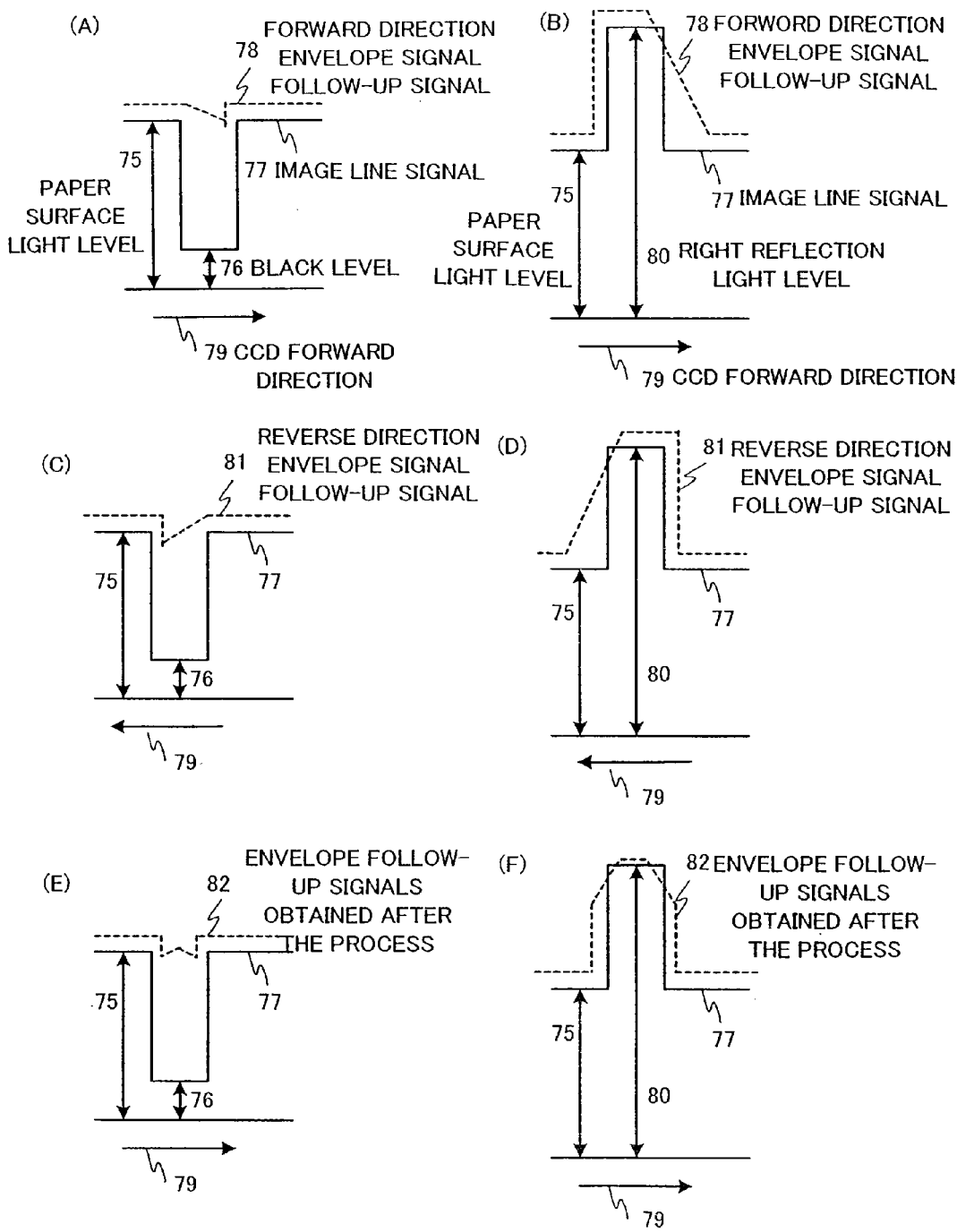
FIGS. 12(A) to 12(F) are signal waveform charts for describing gradation conversion and illumination non-uniformity correction in the embodiment of the present invention.

Principles underlying the envelope detection will now be described with reference to FIGS. 12(A) to 12(D). FIGS. 12(A) to 12(B) illustrate forward direction envelope detection. Here, light level comparison of a pixel under notice and the immediately preceding pixel in the CCD forward output direction in an image line signal 77, which has been read out from the original image memory 66 and subjected to the smoothing process 77, is made. If the light level of the pixel under notice is higher, the difference of a certain value from that value is made to be the value of present pixel. Otherwise, the light level of the immediately preceding pixel is made to be the value of the present pixel. Then, forward direction envelope signal follow-up signal 78 of one line is generated and written in the forward direction envelope memory 68.

FIGS. 12(C) and 12(D) reverse direction envelope detection. Here, light level comparison of a pixel under notice and an immediately preceding pixel in the CCD output order direction in image line signal 77, which has been read out from the original image memory 66 and subjected to smoothing process. If the light level of the pixel under notice is higher, the difference of a certain value from that value is made to be the value of the present value. Otherwise, the light level of the preceding pixel is made to be the value of the present pixel. Then, reverse direction envelope follow-up signal 61 for one line is generated and written in the reverse direction envelope memory 69.

As the values for subtraction in both the envelope detection processes, those which are best suited for the intended image recognition process have to be used and are determined by adjustment.

Considering compensation, in which gradation conversion is made with the forward direction envelope follow-up signal 78 as white reference light level, in the case of a sufficiently small width with respect to black level 76 which is lower than paper surface light level 75, contrast between the forward direction envelope follow-up signal 78 and the black level 76 can be held. On the other hand, in the case of presence of right reflection light level 89 higher than the paper surface light level, irrespective of the right reflection light, the level of the forward direction envelope follow-up signal 78 is not lowered as soon as the restoration of the image line signal 77 to the paper surface level 75, but a contrast is generated. This is also the case when the sole reverse direction envelope follow-up signal 78 is taken into consideration.

It is now assumed that light level comparison of individual pixels of the two calculated envelop signals is made and that the smaller one of these signals used as paper surface light level follow-up signal for illumination non-uniformity correction. FIGS. 12(E) and 12(F) show envelope follow-up signals 82 obtained after the process. It will be seen that contrast of the envelope signals before and after the right reflection as shown in FIGS. 12(B) and 12(D) with respect to the image line signal can be perfectly removed except for deviation for one line.

The forward and reverse envelope follow-up signals 78 and 81 are compared in a comparison process 70. As a result, envelope line follow-up signals 82 is fed as upper address to a ROM 71. The original image line signal which has been the basis of the envelope signal, is fed as lower signal from the original image memory 66.

Calculation of:

(illumination non-uniformity correction data)=(white reference level)÷(paper surface level follow-up value)×(image value), is preliminarily done with respect to all values capable of being taken as paper surface light level follow-up value and also all values capable of being taken up as image value, and the result of the calculation is written in the ROM 71 with the paper surface light level follow-up value and the image value as upper and lower ROM addresses, respectively. However, if the paper surface level follow-up value is no greater than a certain threshold value, it is regarded as the paper surface light level, and the level presetting is done such as not to irrationally raise it to the white reference level.

With the presetting of the calculated envelope follow-up signals 82 to the white reference level as the paper surface level follow-up value, it is possible to compensate for illumination irregularities and also irregularities due to lens shading and the like in one line scan while holding optimum gradation, as well as absorbing time variations from the illumination light source turn-on time and long-term deterioration variations, thus obtaining uniformly bright images at all times.

The equation noted above is purely linear with respect to the image value, but it is also possible to make compensation operation by multiplying the equation by a normalized weight constant varying which is variable according to the image value.

The illumination non-uniformity correction data 73 as the above calculation result is calculated in the parameter controller 36 in the recognition unit 7, and is written via the control circuit 36 at the time of adjustment for shipment or like timing.

The output of the ROM 71, having been gradation converted and illumination non-uniformity correction, is subjected to a thinning-out process 72 according to the area sensor value, and is then fed to the image data transfer circuit 34.

The image data transfer circuit 34 transfers image data as image via optical fiber or in the form of LVDS signal to the image recognition processor 35 in the image recognition unit 7. As the image recognition process, such processes as letter or character recognition process for recognizing postal number, address, ISBN code number of book, etc. and indetia or like detection process may be done. Particularly, as the ISBN code number there are many colorful ones, and in this case recognition by color imaging is advantageous.

The above numerical values of the field of view, resolution, etc. are given as mere examples, and are thus by no means limitative.

A second embodiment of the present invention will now be described in detail with reference to the drawings.

Figure 13:
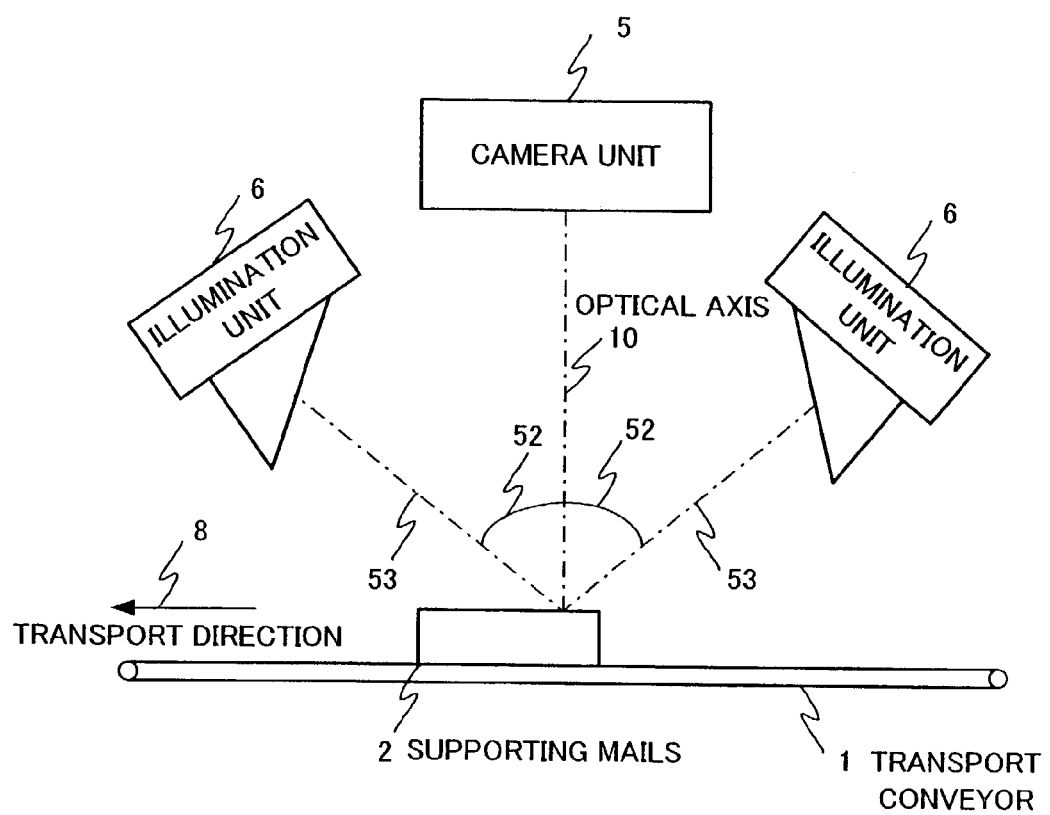
FIG. 13 is a block diagram showing the construction of an optical system in a second embodiment of the image input apparatus according to the present invention.

In this embodiment, as shown in FIG. 13, two illumination units each as in the first embodiment are used, and the optical axis 10 of the camera is preset to be perpendicular to the transport direction.

With the perpendicular axis of the camera to the transport direction, unlike the first embodiment, the timing of imaging is not varied according to the value of the area sensor value. Also, unlike the case of FIG. 6, this embodiment is free from a case that imaging becomes impossible due to height relation of mail to the next one. In addition, with doubling of the illumination light intensity the scene object can be illuminated with increased illumination intensity. This leads to depth improvement of the camera with freedom from mechanical auto-focusing by operating the lens stop, and permits improving the image focus with respect to irregularities of the scene object in the scan direction. Furthermore, with reduced shutter time it is possible to take out images of improved resolution.

A third embodiment of the present invention will now be described in detail with reference to the drawings. In this embodiment, unlike the first or second embodiment, camera unit 5 is provided with both high resolution monochromatic imaging and low resolution color imaging functions.

Figure 14:
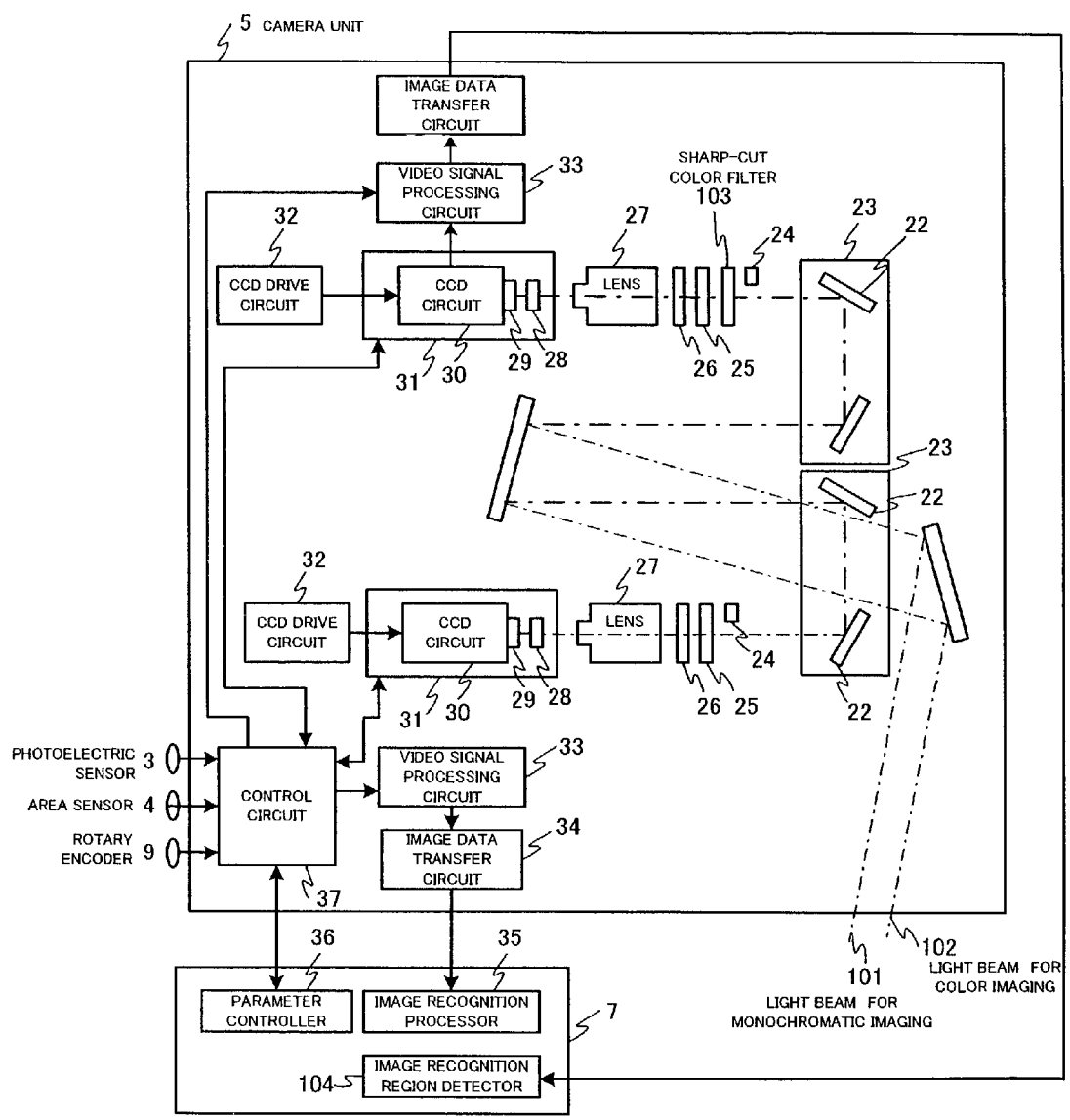
FIG. 14 is a block diagram schematically showing the circuit construction of a third embodiment of the image input apparatus according to the present invention.

FIG. 14 is a block diagram showing the construction of the camera unit 5.

A light beam 101 for monochromatic imaging and a light beam 102 for color imaging are reflected by mirror 22 while they are held parallel and spaced apart a predetermined distance. The construction of the optical paths of the monochromatic and color light beams up to the CCD are substantially the same in construction as in the above embodiments except for the provision of a sharp-cut color filter 103. The two optical paths are basically the same in the subsequent stage as well. However, in video signal processing circuit 33 of the color imaging system, white level compensation is further added in a monochromatic illumination non-uniformity correction. Also, the difference of resolution leads to a difference of the step number of the stepping motor, i.e., a difference of a delay parameter for presetting the image take-out timing from the difference of the position under notice.

Low color resolution images are transferred to an image recognition region detector 104 in recognition unit 7 to be used for finding a region, in which image recognition is actually caused, in image taken out as high resolution monochromatic image. Thus, high resolution image recognition in the full field of view is not made, thus permitting processing rate improvement.

For example, where subject areas for image recognition are always written in blue frames or provided with red heart marks, they are detected as low resolution color images and added to an area including a certain margin from the detected position for image recognition in high resolution monochromatic images.

A fourth embodiment of the present invention will now be described.

Figure 15:
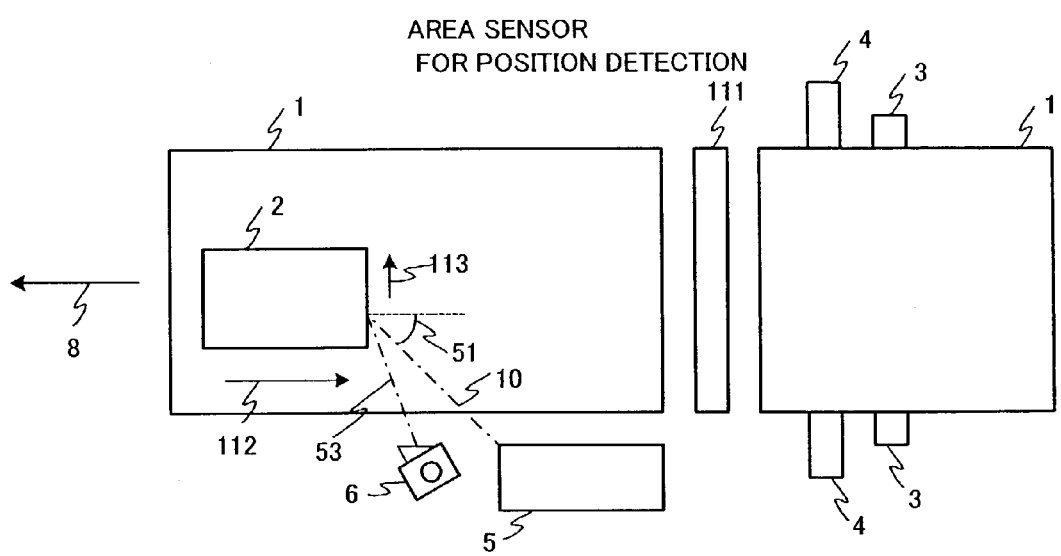
FIG. 15 is a block diagram schematically showing the disposition of elements for reading out the side surface and the rear surface of mails.

In this embodiment, unlike the first embodiment, optical axis angle 5 of the camera is preset to 45 degrees for imaging not only the top surface of the scene object but also the rear surface (or front surface) thereof.

Where camera unit 5 is installed as shown in FIG. 1, with the optical axis 10 of the camera directed downward from an obliquely rearward position in the transport direction, after imaging the top surface as in the first embodiment, the rear surface is imaged with auto-focusing follow-up according to the height up to a height of 0 mm.

Where the camera unit 5 is disposed such that the optical axis of the camera is directed downward from an obliquely forward position in the transport direction, the front surface is first imaged with auto-focusing follow-up from a height of 0 mm up to the height of mail, and then the top surface is imaged as in the first embodiment.

Where camera unit 5 and illumination unit 6 disposed such as to read out the side surface of mail as shown in FIG. 15, with the optical axis 10 of the camera directed obliquely rearward in the transport direction, a side surface of the mail is first imaged with positioning of the auto-focusing in direction 112 according to the output of an area sensor 111 for position detection. Then, the rear surface of the mail is imaged with auto-focusing follow-up in a direction 113.

The area sensor 111 for position detection, like the photoelectric sensor 3 and the area sensor 4 for height detection, is vertically disposed forwardly of the field 10 of sight of the camera in the transport conveyor at a conveyor seam.

Where the optical axis 10 of the camera is directed obliquely forward in the transport direction, the front surface is first imaged with auto-focusing follow-up, and then a side surface is imaged with fixed auto-focusing.

A fifth embodiment of the present invention will now be described in detail with reference to the drawings. In this embodiment, a plurality of camera units as that in the first embodiment are used and disposed differently in the fashion as in the fourth embodiment for imaging mails in a total of six different directions.

Figure 16:
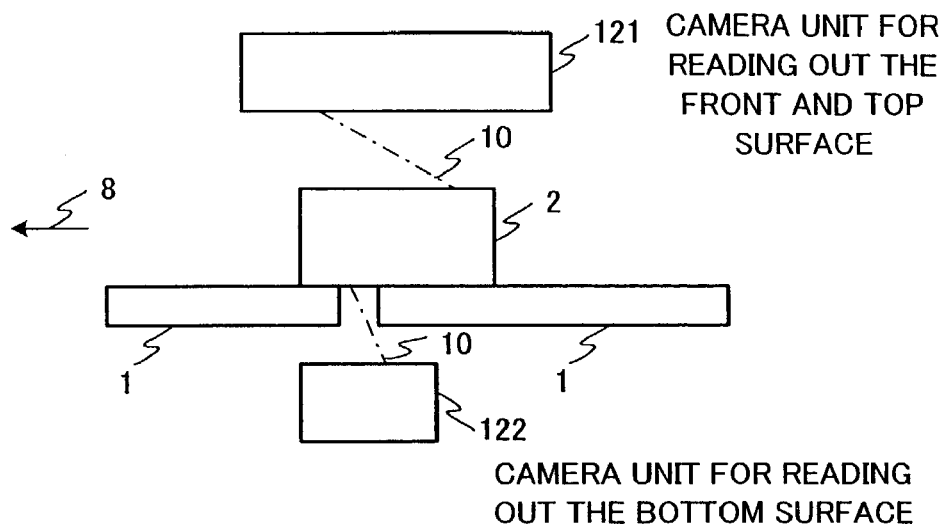
FIGS. 16(A) and 16(B) are a side view and a top view, respectively, showing the disposition and construction of a camera unit in a fifth embodiment of the image input apparatus according to the present invention.
Figure 16:
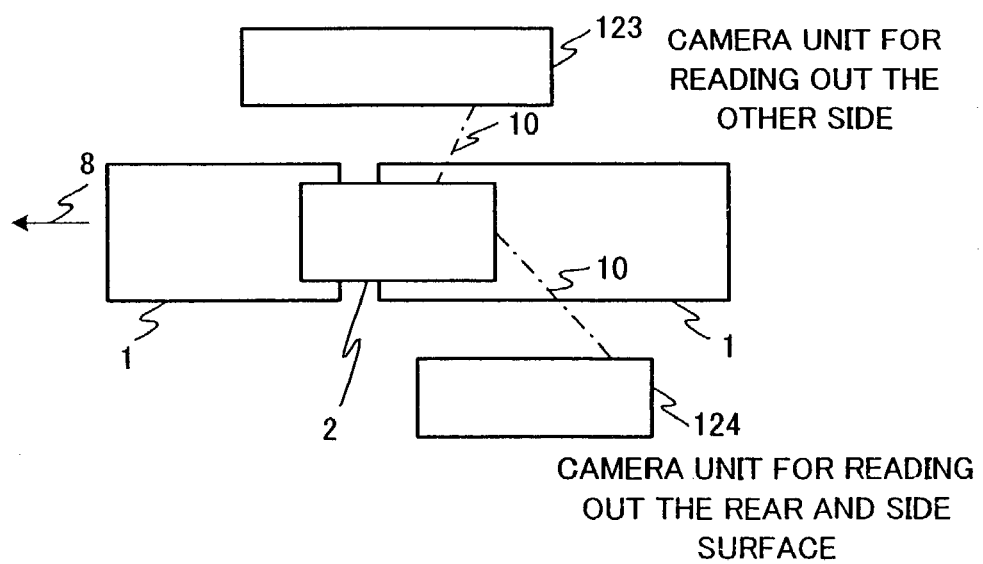

FIG. 16(A) is a side view showing the camera unit disposition in this embodiment. In FIGS. 16(A) and 16(B) illumination unit paired with each camera unit, photo-electric sensor 3, area sensor 4 for height detection, an area sensor 111 for position detection, are not shown.

As shown in FIG. 16(A), above transport conveyor 1, a camera unit 121 for reading out the front and top surfaces of mails is disposed such that the optical axis 10 of the camera is directed downward from an obliquely forward position in the transport direction. Also, a camera unit 122 for reading out the bottom surface of the camera is disposed such that the optical axis of the camera extends upward from a conveyor seam.

Regarding the camera unit 122 for reading out the bottom surface, auto-focusing is not particularly needed.

FIG. 16(B) is a bottom view showing the camera unit disposition in this embodiment. On one side of the transport conveyor 1, a camera unit 124 for reading out the rear and side surfaces of mails is disposed such that the optical axis of the camera 10 is directed forward from an obliquely rearward position in the transport direction. Also, a camera unit 123 for reading out the other side surface of mails is disposed on the opposite side.

With the above disposition of the four camera units, it is possible to image mails in a total of six different directions.

As described before, with the image input apparatus according to the present invention the following pronounced effects are obtainable.

(1) It is possible to take out in-focus images by using auto-focusing. It is thus possible to automatically sort out mails by causing an image recognition process on the taken-out images.

(2) By forming an integral unit including a high resolution monochromatic imaging system and a low resolution color imaging system, it is possible to improve the rate of sorting process by causing recognition subject region position detection in low resolution color and image recognition process in high resolution color.

(3) It is possible to suppress contrast deterioration of images in the event of occurrence of right reflection from a mail with polarization filter, envelope detection means and position relation of the optical axis of the camera and illumination optical axis.

(4) By using only the necessary part of CCD by shielding the out-of-use part thereof with shielding means, it is possible to improve the rate of operation and use a versatile and inexpensive CCD.

(5) By using a plurality of image input apparatuses according to the present invention it is possible to do a full surface image recognition process on mails by imaging the mails in full six directions. It is thus not necessary to take image recognition process surfaces of mails into considerations when putting the mails on the transport conveyor.

Changes in construction will occur to those skilled in the art and various apparently different modifications and embodiments may be made without departing from the scope of the present invention. The matter set forth in the foregoing description and accompanying drawings is offered byway of illustration only. It is therefore intended that the foregoing description be regarded as illustrative rather than limiting.

What is claimed is:

1. An image input apparatus comprising:
  a transport apparatus operable to move a scene object in a predetermined transport direction;
  an illuminating unit including a light source for emitting a linear light beam toward the scene object being moved in the predetermined transport direction by the transport apparatus and a glass member for cutting off heat rays and ultraviolet rays from the light source and transmitting visible light rays;
  an imaging unit for imaging the scene object illuminated by the linear light beam in a linear field of view;
  a photoelectric sensor configured to detect the scene object with respect to the transport direction of the transport apparatus prior to the imaging;
  an area sensor positioned downstream of the photoelectric sensor with respect to the transport direction and configured to detect a height parameter of the scene object, an operation of the area sensor to detect the height parameter started at a timing according to the detection of the scene object by the photoelectric sensor;

an auto-focusing apparatus configured to start auto-focusing the imaging unit at a timing determined according to the detection of the scene object by the photoelectric sensor, the auto-focusing performed for the imaging of the scene object; and further comprising a video signal processing unit including an image compensation unit configured to perform gradation compensation and illumination non-uniformity correction of data received from a CCD reading in a CCD reading direction light reflected off the scene object;

the image compensation unit configured to perform for each pixel the gradation compensation and the illumination non-uniformity correction based on both a forward envelope signal and a reverse envelope signal, the forward envelope signal being a first smoothed out value generated based on a pixel value of an instant pixel and the pixel value for a first reference pixel immediately preceding in the CCD reading direction the instant pixel, the reverse envelope signal being a second smoothed out value based on the pixel value of the instant pixel and the pixel value of a second reference pixel immediately following in the CCD reading direction the instant pixel, wherein a linear stepping motor is operable to auto-focus the image input apparatus, and the auto-focusing is made with back-and-forth movement of a printed board on which a linear array CCD for monochromatic or color imaging of a photo-electric conversion unit is mounted, and wherein positioning is performed based on a restoration of the linear stepping motor to an origin when an inter-mail distance between adjacent mails is sufficient with respect to a positioning motion time inclusive of a time for restoration to the origin, and otherwise auto-focusing is made by causing relative movement of the stepping motor only by a difference of motion parameters based on a previous position.

2. The image input apparatus according to or claim 1, wherein only a single illuminating unit is provided, with an optical axis thereof making an acute angle with respect to the transport direction of the transport apparatus, the acute angle being different from the angle between an optical axis of the imaging unit and the transport direction of the transport apparatus.

3. The image input apparatus according to claim 1, wherein two illuminating units are provided, the two illuminating units opposing each other via the linear field of view of the imaging unit.

4. The image input apparatus according to claim 1, wherein a high voltage sodium lamp is used as the light source of the illuminating unit, and the imaging unit comprises a monochromatic unit to image the scene object to produce a monochromatic image and a color unit to image the scene object to produce a color image.

5. The image input apparatus according to claim 4, wherein the monochromatic unit and the color imaging unit are substantially identical in a width of the field of view for imaging and in an imaging position and different in optical magnification.

6. The image input apparatus according to claim 1, wherein a metal halide lamp is used as the light source of the illuminating unit, and the imaging unit images the scene object to produce a color image.

7. The image input apparatus according to claim 1, wherein the imaging unit includes a polarization filter, an ultraviolet-cut filter and a sharp-cut filter disposed on an optical path.

8. The image input apparatus according to claim 1, wherein the imaging unit includes an optical system comprising a plurality of mirrors for bending an optical path, thereby providing an increased optical path length.

9. The image input apparatus according to claim 8, wherein surface accuracy of mirrors in the imaging unit is preset to be $\lambda/4$.

10. The image input apparatus according to claim 1, wherein the area sensor is used for detecting an imaging distance, and a distance profile with respect to the scene object is produced for imaging with focus follow-up by the auto-focusing apparatus.

11. The image input apparatus according to claim 10, wherein a top surface of the scene object is illuminated and imaged by the imaging unit.

12. The image input apparatus according to claim 10, wherein a front or a rear surface in the transport direction of the scene object and a top surface thereof are illuminated by the illuminating unit and imaged by the imaging unit.

13. The image input apparatus according to claim 12, wherein the image input apparatus is operable to image the scene object in a total of six directions.

14. The image input apparatus according to claim 1, wherein the area sensor or a displacement sensor is used for detecting an imaging distance as a position in a direction perpendicular to the transport direction of the transport apparatus.

15. The image input apparatus according to claim 14, wherein one side surface of the scene object with respect to the transport direction is imaged by the imaging unit.

16. The image input apparatus according to claim 14, wherein a front or a rear or one side surface of the scene object in the transport direction is imaged by the imaging unit.

17. An image input apparatus for illuminating by an illuminator a scene object moved in a predetermined transport direction by a transport apparatus, and for imaging the scene object with an imaging device and discriminating data of the scene object from imaged data obtained from the imaging of the scene object, the image input apparatus comprising:

a photoelectric sensor operable to detect the scene object with respect to the transport direction of the transport apparatus before the imaging; and an area sensor positioned downstream of the photoelectric sensor with respect to the transport direction and operable to detect a height parameter of the scene object, wherein a start of operation of the area sensor and a start of auto-focusing by the imaging device for imaging the scene object are timed according to the detection of the scene object, wherein a linear stepping motor is operable to auto-focus the image input apparatus, and the auto-focusing is made with back-and-forth movement of a printed board on which a linear array CCD for monochromatic or color imaging of a photo-electric conversion unit is mounted, and wherein positioning is performed based on a restoration of the linear stepping motor to an origin when an inter-mail distance between adjacent mails is sufficient with respect to a positioning motion time inclusive of a time for restoration to the origin, and otherwise auto-focusing is made by causing relative movement of the stepping motor only by a difference of motion parameters based on a previous position.

* * * * *